United States Patent [19]

Rhodes et al.

[11] Patent Number: 5,460,739

[45] Date of Patent: Oct. 24, 1995

[54] STAR POLYMER VISCOSITY INDEX IMPROVER FOR OIL COMPOSITIONS

[75] Inventors: Robert B. Rhodes; Dale L. Handlin, Jr.; Craig A. Stevens, all of Houston, Tex.

[73] Assignee: Shell Oil Company, Houston, Tex.

[21] Appl. No.: 303,972

[22] Filed: Sep. 9, 1994

[51] Int. Cl.⁶ .................... C10M 107/14; C08F 293/00; C08F 255/06; C08F 295/00
[52] U.S. Cl. .................. 252/43; 525/314; 525/316
[58] Field of Search .................. 252/43; 525/314, 525/316

[56] References Cited

U.S. PATENT DOCUMENTS

| | | |
|---|---|---|
| Re. 27,145 | 6/1971 | Jones . |
| 3,231,635 | 1/1966 | Holden et al. . |
| 3,242,038 | 3/1966 | Dalls et al. . |
| 3,652,732 | 3/1972 | Makowski et al. . |
| 3,772,196 | 11/1973 | St. Clair et al. . |
| 3,956,426 | 5/1976 | Schepers . |
| 3,985,830 | 10/1976 | Fetters et al. . |
| 4,116,917 | 9/1978 | Eckert . |
| 4,141,847 | 2/1979 | Kiovsky . |
| 4,156,673 | 5/1979 | Eckert . |
| 4,221,884 | 9/1980 | Bi et al. ................................ 525/314 |
| 4,427,828 | 1/1984 | Hergenrother et al. . |
| 4,578,429 | 3/1986 | Gergen et al. . |
| 4,849,481 | 7/1989 | Rhodes et al. . |
| 4,921,625 | 5/1990 | Gorman et al. . |
| 5,073,600 | 12/1991 | Gorman et al. . |
| 5,218,044 | 6/1993 | Gelles et al. . |
| 5,310,490 | 5/1994 | Struglinski et al. . |
| 5,314,951 | 5/1994 | Custro et al. ............................ 525/314 |
| 5,399,629 | 3/1995 | Coolbaugh et al. ..................... 525/314 |

Primary Examiner—Jerry D. Johnson
Attorney, Agent, or Firm—Keith M. Tackett

[57] ABSTRACT

The present invention includes star polymers which can be used as viscosity index improvers in oil compositions formulated for high performance engines. The star polymers have triblock copolymer arms of hydrogenated polyisoprene-polybutadiene-polyisoprene, which provide excellent low temperature performance in lubricating oils, and can be used in the presence of low pour point depressant concentrations.

18 Claims, No Drawings

STAR POLYMER VISCOSITY INDEX IMPROVER FOR OIL COMPOSITIONS

FIELD OF THE INVENTION

This invention relates to star polymers of hydrogenated isoprene and butadiene, and to oil compositions containing the star polymers.

BACKGROUND OF THE INVENTION

The viscosity of lubricating oils varies with temperature. In general, oils are identified by a viscosity index which is a function of the oil viscosity at a given lower temperature and a given higher temperature. The given lower temperature and the given higher temperature have varied over the years but are fixed at any given time in an ASTM test procedure (ASTM D2270). Currently, the lower temperature specified in the test is 40° C. and the higher temperature is 100° C. For two engine lubricants with the same kinematic viscosity at 100° C., the one having the lower kinematic viscosity at 40° C. will have the higher viscosity index. The oil with the higher viscosity index undergoes less kinematic viscosity change between the temperatures of 40° C. and 100° C. In general, viscosity index improvers that are added to engine oils increase the viscosity index as well as the kinematic viscosities.

The SAE Standard J300 viscosity classification system does not specify the use of viscosity index to classify multigrade oils. At one time, however, the Standard did require that certain grades meet low-temperature viscosities that were extrapolated from kinematic viscosity measurements taken at higher temperatures, for it was recognized that oils that were exceedingly viscous at low-temperatures caused engine starting difficulties in cold weather. For this reason, multigrade oils which possessed high viscosity index values were favored; these oils gave the lowest low-temperature extrapolated viscosities. Since then, ASTM has developed the cold cranking simulator (CCS), ASTM D5293, (formerly ASTM D2602) a moderately high-shear-rate viscometer which correlates with engine cranking speed at low temperatures, and today cranking viscosity limits, determined by the CCS, are defined in the SAE J300 Standard.

Today, it is also recognized that cranking viscosity is not sufficient to fully estimate a lubricant's low-temperature performance in engines. SAE J300 also requires that a pumping viscosity be determined in a low-shear-rate viscometer called the mini-rotary viscometer (MRV). This instrument can be used to measure viscosity and gel formation, the latter by the measurement of yield stress. In this test, an oil is slowly cooled over a two-day period to a specified temperature before viscosity and yield stress are determined. A yield stress observation constitutes an automatic failure in this test, while pumping viscosity must be below a specified limit to ensure that the oil will not cause an engine to experience a pumping failure during cold weather conditions. The test is sometimes referred to as the TP1-MRV test, ASTM D4684.

Numerous materials are used in the formulation of fully-formulated multigraded engine oils. Besides the basestocks, which may include paraffinic, napthenic, and even synthetically-derived fluids, the polymeric VI improver, and the pour point depressants, there are numerous lubricant additives added which act as antiwear agents, antirust agents, detergents, dispersants, and pour point depressant. These lubricant additives are usually combined in diluent oil and are generally referred to as a dispersant-inhibitor package, or as a "DI" package.

Common practice in the formulation of a multigrade oil is to blend to a target kinematic viscosity and cranking viscosity, which is determined by the specified SAE grade requirements in SAE J300. The DI package and pour point depressant are combined with a VI improver oil concentrate and with one basestock, or two or more basestocks having different viscosity characteristics. For example, for an SAE 10W-30 multigrade, the concentration of the DI package and the pour point depressant might be held constant, but the amounts of HVI 100 neutral and HVI 250 neutral or HVI 300 neutral basestock might be adjusted along with the VI improver until the target viscosities are arrived at.

The pour point depressant's selection normally depends on the type of wax precursors in the lubricant basestocks. However, if the viscosity index improver itself is prone to interact with wax precursors, it may be necessary to add an additional pour point depressant of a different type, or an additional quantity of the pour point depressant used for the basestocks to compensate for that interaction. Otherwise, low-temperature rheology will deteriorate, and TP1-MRV failures will result. The use of additional pour point depressant generally increases the cost of formulating an engine lubricant.

Once a formulation has been arrived at that has the targeted kinematic viscosities and cranking viscosities, the TP1-MRV viscosity is determined. A relatively low pumping viscosity and the absense of yield stress is desirable. The use of a VI improver which contributes little to low-temperature pumping viscosity or yield stress is very desirable in the formulation of multigrade oils; it minimizes the risk of formulating an oil that may cause an engine pumping failure and it provides the oil manufacturer with additional flexibility in the use of other components which contribute to pumping viscosity. To minimize the amount, or number of pour point depressants that must be used, it is advantageous that the polymeric viscosity index improver's composition be designed so that it will not interact with wax precursors.

When multigrade engine lubricants are manufactured, the VI improver is introduced in an oil concentrate. The VI improver is dissolved into basestock, such as HVI 100 neutral, before use. In some instances, the lubricant manufacturer may not have concentrate dissolving facilities, so the oil concentrate must be transported to the user as a concentrate rather than as a solid. It is advantageous to be able to transport a VI improver oil concentrate that is not gelled at room temperature. Gelation makes it difficult or impossible to pour or pump the concentrate into lubricant blending vessels.

The star polymers of the present invention are readily produced by the processes described in Canadian Patent No. 716,645 and U.S. Pat. No. Re. 27,145. However, the star polymers of the present invention have molecular weights and compositions which are not taught by the references and are selected to obtain surprisingly improved low temperature performance as a viscosity index improver.

Viscosity index improvers that are hydrogenated star polymers containing hydrogenated polymeric arms of copolymers of conjugated dienes, including polybutadiene made by the high 1,4-addition of butadiene, was previously described in U.S. Pat. No. 4,116,917. In examples 7–10 of U.S. Pat. No. 4,116,917 anionic polymerization of butadiene and isoprene was used to produce star polymers with hydrogenated poly(butadiene/isoprene) tapered arms wherein the star arms contained hydrogenated polybutadiene blocks that were external to the coupled nucleus. In each of these four examples, butadiene represented 44.3 percent weight of the diene content of the unhydrogenated precurser arms, before coupling with divinylbenzene to produce the unhydrogenated star polymer. Since butadiene initially reacts faster than isoprene when the anionic polymerization is initiated with secondary butyllithium, a polybutadiene block is first formed. As the butadiene concentration is lowered through polymerization, isoprene begins to add to the living polymer so that when the polymerization reaction is complete, the chain is made up of a polybutadiene block, a tapered segment containing both butadiene and isoprene addition product, and a polyisoprene block, to give a living tapered polymer that, when coupled with divinylbenzene, produces a star polymer with the polybutadiene content becoming dominant away from the divinylbenzene-coupled nucleus. Since polymerization conditions favored high-1,4 addition of butadiene, rather than 1,2-addition, vinylic pendant group attachment to the carbon-carbon backbone of the linear chain is minimized, so that, after hydrogenation, the external positions of the arms, remote from the nucleus, resemble polyethylene-like blocks. Then, if there is 90 percent 1,4-addition and 10 percent 1,2-addition of butadiene, after coupling and hydrogenation the polyethylene-like segments will contain 18 ethylene —$(CH_2CH_2)$— segments for every —$(CH_2$—$CHR)$—, where R represents a pendant side-chain ethyl pendant group. Thus, the polymerization method used results in the placement of polyethylene-like segments at the external positions of the hydrogenated arms of the star polymer, remote from the coupled nucleus.

The hydrogenated tapered star polymers of Examples 7–10 were blended into a multigrade engine oil to provide examples 27–30 in U.S. Pat. No. 4,116,917. While dynamic viscosity was measured in the cold cranking simulator at 0° F. by ASTM D2602, such measurements do not correlate with pumping viscosity measurements, and pumping viscosity measurements were not reported.

It is well-established that linear block copolymers such as hydrogenated poly(isoprene-butadiene) block copolymers derived from high-1,4 addition anionic polymerization methods have crystalline hydrogenated polybutadiene blocks, whose melting points can be readily determined by differential scanning calorimetry. Star polymer viscosity index improvers containing crystalline polybutadiene blocks are described in U.S. Pat. No. 5,310,490. In example 7, provided in U.S. Pat. No. 5,310,490, anionic polymerization was initiated first with isoprene and secondly with butadiene to produce a poly(isoprene-butadiene) block copolymer which contained 44 percent by weight of butadiene before coupling with silicon tetrachloride. Such placement is exemplified by a star polymer having the diblock arm structure (hydrogenated polyisoprene-hydrogenated polybutadiene-)$_4$-Si. In another star polymer example (example 10) the order of addition of monomer was reversed so that the polymerization was first initiated with butadiene followed by isoprene, to produce a poly(butadiene-isoprene) block copolymer which contained 34 percent weight of butadiene before coupling with silicon tetrachloride followed by hydrogenation. That process makes a star polymer having the arm structure (hydrogenated polybutadiene-hydrogenated polyisoprene-)$_4$-Si.

Polymers 7 and 10 were each dissolved in a basestock containing a commercial fumarate-vinyl acetate flow improver (otherwise known as a pour point depressant) and their low temperature contributions were compared in Table 3 of U.S. Pat. No. 5,310,490.

SUMMARY OF THE INVENTION

The present invention includes star polymers useful as viscosity index improvers in oil compositions formulated for high performance engines. The star polymers have specific triblock copolymer arms of hydrogenated poly(isoprene-butadiene-isoprene) which significantly improves low temperature performance of the polymers as viscosity index improvers 1) when the star polymers comprise from 3% to 15% by weight of the hydrogenated polybutadiene blocks which have at least 85 mol % 1,4-polymerization of the butadiene and 2) when the ratio of the number average molecular weight of the outer polyisoprene blocks to the inner polyisoprene blocks is from 0.75:1 to 7.5:1 prior to hydrogenation. The star polymers of this invention provide reduced viscosity at low temperatures in comparison to star polymers having block ratios lower than 0.75:1 or higher than 7.5:1 (which includes diblock arms) as measured by a smaller contribution to pumping viscosity and no yield stress in the TP1-MRV. The star polymers of this invention offer reduced viscosity at low temperatures when in company with lower pour point concentrations than hydrogenated poly(isoprene-butadiene) stars, that is (EP-EB)$_n$stars, of comparable and higher butadiene contents.

DETAILED DESCRIPTION OF THE INVENTION

Star polymers of the present invention combine hydrogenated polyisoprene blocks and hydrogenated polybutadiene blocks in molecules having the structure (EP-EB-EP')$_n$-X, wherein EP is an outer hydrogenated block of polyisoprene having a number average molecular weight (MW$_1$) between 6,500 and 85,000 before hydrogenation, EB is a hydrogenated block of polybutadiene having at least 85% 1,4-polymerization of the butadiene and having a number average molecular weight (MW$_2$) between 1,500 and 15,000 before hydrogenation, EP' is an inner hydrogented block of polyisoprene having a number average molecular weight (MW$_3$) of between 1,500 and 55,000, wherein the star polymer comprises less than 15% by weight of the polybutadiene, the ratio of EP/EP' is from 0.75:1 to 7.5:1 before hydrogenation, X is a nucleus of a polyalkenyl coupling agent, and n is the average number of (EP-EB-EP') arms per star molecule formed by the reaction of 2 or more moles of the polyalkenyl coupling agent per mole of arms.

Prior to coupling, the arms have the structure polyisoprene-polybutadiene-polyisoprene'-Li (I-B-I'-Li). The living polymer molecules are coupled with a polyalkenyl coupling agent such as divinylbenzene wherein the ratio of moles of divinylbenzene to living polymer molecules is at least 2:1, and preferably at least 3:1. The star polymer is then selectively hydrogenated to saturate at least 95% by weight of the isoprene and butadiene units. The star polymers are readily produced by the processes described in Canadian Patent No. 716,645 and U.S. Pat. No. Re 27,145.

The star polymers of the present invention have molecular weights which are not taught by the references and are selected to obtain surprisingly improved low temperature performance in multigrade oils that contain surprisingly low pour point depressant concentrations. The star polymers of the present invention do not provide gelled oil concentrates at room temperature, and do not provide multigrade oils with time-dependent 40° C. kinematic viscosities and with time-dependent viscosity indexes.

In the solid state, differential scanning calorimetry (DSC) results indicate that polymers of this invention are semicrystalline polymers whose melting point and crystalline character is derived from the inclusion of the EB hydrogenated blocks. These blocks are somewhat similar to polyethylene blocks that contain a small amount of copolymerized butylene since the addition of butadiene is not entirely via 1,4-addition. Thus, in anionic polymerization if there is 90 percent 1,4-addition and 10 percent 1,2-addition of butadiene, after coupling and hydrogenation the polyethylene-like segments will contain 18 —(CH$_2$—CH$_2$)— segments for every —(CH$_2$—CHR)—, where R represents a pendant ethyl group. It is the polyethylene-like block that can potentially interact negatively with the paraffinic and isoparaffinic wax formers that are present in basestocks.

Star polymers that contain hydrogenated polyisoprene arms do not suffer this interaction with wax precursors because of the abundance of pendant alkyl side-chain groups that are present when 1,4-addition, 3,4-addition, or 1,2-addition occurs with isoprene. The star polymers of this invention are designed to be non-interactive to wax, like the hydrogenated all-polyisoprene-arm star polymers, but have better performance than the all-polyisoprene-arm stars because they undergo coil volume collapse at low temperature due to crystallization.

The polymer examples of this invention can be dissolved in oil above room temperature. When the oil is heated, the EB portion of the star molecule melts and is solubilized in the oil. This increases the oil's viscosity when it is needed for higher temperature protection of the engine. When the temperature is lowered, the polymers undergo intramolecular crystallization of the hydrogenated polybutadiene blocks in adjacent arms of a single star molecule. The coil volume of each star molecule is reduced when intramolecular crystallization of the EB blocks occur. The EP blocks are required to retain polymer solubility in oil, and to minimize or prevent intermolecular crystallization. In oil, crystallization occurs somewhat below the melting point of the solid polymers. For the star polymers of this invention, crystallization in oil occurs below 40° C., so there is no time-dependent effect on kinematic viscosity at 40° C. Likewise, the viscosity index determination does not increase or decrease due to very slow crystallization of polymer in oil.

The performance advantages of the polymers described by this invention relative to the prior art can readily be observed by a reduced contribution to low-shear-rate viscosity and the absence of a yield stress, which results in an automatic failure, at lower temperatures in the TP1-MRV test. The TP1-MRV improvements for the polymers described by this invention occur with reduced pour point depressant concentrations compared to those required for (EP-EB)$_n$ stars.

Common practice dictates that engine lubricants have viscosity indexes that are not variable; however, for the engine lubricant comparison examples which follow which contain (EP-EB)$_n$ block copolymer stars and budadiene contents of more than 10 percent weight, the viscosity index changes with time because the crystallization of the polymer in oil is slow, and occurs above 40° C. For such polymers in a lubricant, the 40° C. kinematic viscosity is time dependent, thus the viscosity index is also time dependent. The viscosity indexes reported herein in Tables 3 and 4 are those obtained when there is no further change in kinematic viscosity at 40° C. For such polymers it takes up to several days before a constant kinematic viscosity is arrived at after blending the formulated oil is completed.

The kinematic viscosity at 40° C., and thus the viscosity index, can either increase or decrease after a freshly-prepared oil blend is stored several days at room temperature. If only intra-molecular crystallization occurs, the coil volume decreases, kinematic viscosity at 40° C. decreases, and this causes viscosity index to go up. If there is inter-molecular crystallization of EB blocks from different star polymer molecules, however, 40° C. viscosity increases, and the determined viscosity index decreases to a constant value with time. It is believed that the extent of inter-molecular crystallization relative to intra-molecular crystallization can be altered by the selection of pour point depressants; thus, a given polymer may provide a 40° C. viscosity increase in some formulations and a decrease in others. However, inter-molecular crystallization is favored for (EP-EB)$_n$ stars if the crystallization sites are made from high 1,4-addition of butadiene, EB has a relatively high number average molecular weight, and the EP block has a relatively low number average molecular weight, so that when star-star entanglements occur there are some EB blocks from neighboring molecules that are in close proximity.

In examples which follow for (EP-EB)$_n$ stars in formulated oils, examples where kinematic viscosity increases and viscosity index decreases occur when EB molecular weight greater than 10,000 and EP block size is relatively low.

The polymers described by the present invention, (EP-EB-EP')$_n$ stars, provide multigrade oils with 40° C. kinematic viscosities and viscosity indexes that are not time dependent; in this case it is believed that crystallization of EB blocks occurs in oil below 40° C. Because crystallization rate is a function of temperature, crystallization is rapid below 40° C. and this is reflected in the low contribution of the polymers to viscosity in the TP1-MRV test.

Thus, it is believed that the polymers of this invention offer improved function as viscosity index improvers because of 1) specific location of the hydrogenated polybutadiene (polyethylene-like) block and 2) the limitation placed on butadiene content. Limitations on block location and percent butadiene minimizes or eliminates the interaction and co-crystallization of wax precursors with the polyethylene-like blocks, minimizes or eliminates the intermolecular crystallization of the polyethylene-like blocks with each other, which can lead to cross-linking of different star molecules, and maximizes the coil volume size reduction that should result at low temperatures when intramolecular crystallization of the arms attached to the nucleus occurs.

It is also believed that by minimization of polybutadiene, and its appropriate placement within the star envelope, so as to be less or non-interactive with the paraffinic and isoparaffinic wax-forming components that are contained in conventional basestocks, a viscosity index improver is produced which can be used with less pour point depressant, which is less sensitive to the composition of the pour point depressant, and which also does not require the use of specialty pour point depressants to minimize the interaction of the viscosity index improver with the wax precursors. Pour point depressants, such as fumarate-vinyl acetate flow improvers, which are effective with viscosity index improvers having polyethylene-like segments have been described in European Patent Application Number 296,714. Interactions of the viscosity index improver with waxy components of basestock is to be avoided, for the imposition of low-temperature cooling in the MRV tests can result in polymer-wax lattice formation that results in high MRV pumping viscosity or gelation of the oil which is evidenced by yield stress failure.

The attachment of many arms to the star nucleus by coupling with divinylbenzene, results in a polymer with a relatively high density of arms which are in close proximity to each other, particularly at the center of the star. It appears that placement of a high density of polyethylene-like blocks adjacent to the star center, such as would be the case of hydrogenated poly(isoprene-butadiene) block copolymers, that is (EP-EB)$_n$stars, provides a strong affinity for a paraffinic and isoparaffinic wax molecules, which have —(CH$_2$—CH$_2$)— segments, to interact with more than one of the hydrogenated polybutadiene blocks coupled to the nucleus of the star and either interfere with the crystallization process, thus preventing complete coil volume shrinkage as the oil is cooled, or associate with the polybutadiene block surfaces, as crystallization takes place. This interaction process may account for failing low-temperature results in fully-formulated oils unless 1) relatively high pour point depressants are co-blended into the formulations, or 2) special pour point depressants are used that are predisposed to interact with the polyethylene-like segments. The use of such specialty pour point depressants does not necessarily preclude the need of an additional pour point depressant, of a different composition, to properly interact with the wax precursors of the basestocks that are included in the formulated oil.

To counteract the high polyethylene-like density near the center of the star, the hydrogenated butadiene blocks may be placed further from the nucleus. It is not known with certainty why such positioning should be favored, however it is believed that when hydrogenated star polymers are used as viscosity index improvers which have hydrogenated poly(isoprene-butadiene-isoprene) arms, that is, (EP-EB-EP')$_n$ stars, the hydrogenated polyethylene-like segment of one arm is further away from adjacent neighbors in solution and the interaction of a wax precursor with multiple hydrogenated polybutadiene blocks of the same polymer molecule is less favored.

On the other hand, polyethylene-like hydrogenated polybutadiene blocks cannot be placed too close to the outer edge or periphery of the star molecule. While wax-polyethylene interaction is to be minimized, the placement of the hydrogenated polybutadiene blocks too close to the outside of the star molecule will result in the inter-molecular crystallization of these arms in solution. The result of intermolecular crystallization is the same as for (EP-EB)$_n$ stars; an increase in viscosity and possibly gelling occurs, which is brought about by the three dimensional crystallization of many star molecules to form a lattice structure.

The crystallization temperature of hydrogenated poly(isoprene-butadiene) star polymers may be lowered by reducing the block molecular weight of hydrogenated polybutadiene together with placement of the hydrogenated polybutadiene between hydrogenated polyisoprene segments, and this reduction results in improved low-temperature TP1-MRV test results. It also results in the the additional benefit of butadiene-containing star polymers that are not sensitive to pour point depressant type or concentration, and which do not provide oils which have time-dependent viscosity indexes. The invention thus describes semicrystalline star polymer viscosity index improvers that provide superior low-temperature performance and which do so without the use of relatively high concentrations of pour point depressant or the need for supplimental pour point depressants.

The star polymers of this invention which are useful as VI improvers are preferably prepared by anionically polymerizing isoprene in the presence of sec-butyllithium, adding butadiene to the living polyisopropyl lithium after the polymerization of the outer block is complete, adding isoprene to the polymerized living block copolymer, and then coupling the living block copolymer molecules with a polyalkenyl coupling agent to form a star polymer, followed by hydrogenation. It is important to maintain high 1,4-addition throughout the polymerization of the butadiene block of the block copolymer so that polyethylene-like blocks of sufficient molecular weight are also obtained. However, it is not important that the inner polyisoprene block be made by high 1,4-addition of isoprene. Thus, it should be feasible to add a randomizer such as diethyl ether to the living block copolymer after the attainment of a sufficient molecular weight of high 1,4-addition butadiene had been obtained.

The randomizer could be added at the conclusion of the butadiene polymerization, and before introduction of more isoprene to give the second polyisoprene block. Alternatively, the randomizer could be added before completion of the butadiene block polymerization, and concurrent with the introduction of isoprene; in this case, after coupling and hydrogenation, the star polymer would be represented by (EP-EB-EB/EP-EP')$_n$X, wherein EB/EP is a small hydrogenated tapered butadiene/isoprene polymer block. The hydrogenated polyisoprene blocks and hydrogenated polybutadiene blocks have the previously described molecular weights and the tapered block would generally be smaller then the butadiene block.

The star polymers of the present invention may be characterized prior to hydrogenation as having a dense center or nucleus of crosslinked poly(polyalkenyl coupling agent) and a number of block copolymer arms extending outwardly therefrom. The number of arms, as determined by conventional gel permeation chromotography (GPC), may vary considerably but typically range from about 6 to about 13. The actual number of arms is unknown; however, GPC-Low Angle Laser Light Scattering indicates a substantially greater number of arms than conventional GPC techniques.

In general, the star polymers may be hydrogenated using any of the techniques known in the prior art to be suitable for hydrogenation of olefinic unsaturation. However, the hydrogenation conditions must be sufficient to hydrogenate at least 95% of the original olefinic unsaturation, and conditions must be employed so that the partially-hydrogenated or fully-hydrogenated polybutadiene blocks do not crystallize and separate from solvent before hydrogenation, or catalyst wash-out is complete. Depending on the percentage of butadiene used in preparation of the star polymer, during and subsequent to hydrogenation in cylcohexane, there is sometimes a marked increase in the viscosity of the solution. To avoid crystallization of the polybutadiene blocks, the solvent temperature should be maintained above the temperature where crystallization would occur.

In general, hydrogenation involves the use of a suitable catalyst as described in U.S. Pat. No. Re 27,145 which is herein incorporated by reference. A mixture of nickel ethylhexanoate and triethylaluminum having from 1.8 to 3 moles of aluminum per mole of nickel is preferred.

The hydrogenated star polymers of this invention may be added to a variety of lubricating oils to improve viscosity index characteristics. For example, the selectively hydrogenated star polymers may be added to fuel oils such as middle distillate fuels, synthetic and natural lubricating oils, crude oils and industrial oils. In addition to engine oils, they may be used in the formulation of automatic transmission fluids, gear lubricants, and hydraulic fluids. In general, any amount of the selectively hydrogenated star polymers may be blended into the oils, with amounts from about 0.05 to about 10 wt % being most common. For engine oils, amounts within the range from about 0.2 to about 2 wt % are preferred.

Lubricating oil compositions prepared with the hydrogenated star polymers of this invention may also contain other additives such as anti-corrosive additives, antioxidants, detergents, pour point depressants, one or more additional VI improvers and the like. Typical additives which are useful in the lubricating oil composition of this invention and their description will be found in U.S. Pat. Nos. 3,772, 196 and 3,835,083, the disclosure of which patents are herein incorporated by reference.

PREFERRED EMBODIMENT OF THE INVENTION

Preferred star polymers of the present invention combine hydrogenated polyisoprene blocks and hydrogenated polybutadiene blocks in molecules having the structure (EP-EB-EP')$_n$-X, wherein EP is an outer hydrogenated block of polyisoprene having a number average molecular weight (MW$_1$) between 15,000 and 65,000 before hydrogenation, EB is a hydrogenated block of polybutadiene having at least 89% 1,4-polymerization of the butadiene and having a number average molecular weight (MW$_2$) between 2,000 and 6,000 before hydrogenation, EP' is an inner hydrogenated block of polyisoprene having a number average molecular weight (MW$_3$) of between 5,000 and 40,000, wherein the star polymer comprises less than 10% by weight of the polybutadiene, the ratio of EP/EP' is from 0.9:1 to 5:1 before hydrogenation, X is a nucleus of a polyalkenyl coupling agent, and n is the average number of (EP-EB-EP') arms per star molecule.

The coupled polymers are selectively hydrogenated with a solution of nickel ethylhexanoate and triethylaluminum having a Al/Ni ratio of about 1.8:1 to 2.5:1 to saturate at least 98% of the isoprene and butadiene units.

Having thus broadly described the present invention and the preferred embodiment, the invention is further described by the following examples which should not be construed as the limits of the invention.

EXAMPLE 1

(Comparison)

In this example, a star polymer comprising diblock arms of hydrogenated isoprene and hydrogenated butadiene was prepared. In the first step of the preparation, living molecules of polyisoprene were prepared by anionically polymerizing isoprene in cyclohexane. The polymerization of the isoprene was initiated by adding sec-butyllithium. The polymerization of the isoprene was completed to produce living polyisoprene molecules having a number average molecular weight of 45,000. Polybutadiene blocks were formed by adding butadiene to the solution of living polyisoprene molecules. The polymerization of butadiene was completed to produce polybutadiene blocks having a number average molecular weight of 4,800 by gel permeation chromatography. Proton NMR analysis indicated that in the absence of a microstructure modifier, the isoprene block contained 6.1 percent vinylic substituents while the butadiene block contained 11.7 percent vinyl substituents as a result of 1,2-addition. Thus, 89.3 percent of the butadiene polymerized by 1,4-addition. From proton NMR it was also determined that 10.5 percent of the polymer was comprised of polybutadiene.

The living diblock copolymer arms were then coupled with divinylbenzene using 3 moles of divinylbenzene per mole of the living block copolymer molecules. The coupling reaction was allowed to proceed to completion after which the lithium sites remaining in the star polymer were deactivated by adding an alcohol. Subsequent proton NMR analysis of the coupled polymer indicated that the butadiene block contained 12.1 percent vinyl substituents, or that 87.9 percent of the butadiene polymerized by 1,4-addition.

The star polymer was next hydrogenated at 75° C. to saturate greater than 98% the olefinic unsaturation originally contained in the isoprene and butadiene blocks using a catalyst prepared by combining nickel ethylhexanoate and triethylaluminum (2.3 moles of aluminum per mole of nickel). The hydrogenation catalyst was then extracted by an aqueous acidic water-wash at room temperature, using a high dilution ratio. Steam/hot water devolatilization was used to coagulate the polymer. Differential scanning calorimetry was used to determine the melting point of the PE-like blocks. The melting point occurred at 89° C. The data and results are summarized in Table 1.

EXAMPLE 2

(Comparison)

In this example, a star polymer comprising hydrogenated poly(isoprene-butadiene) diblock copolymer arms was prepared using the procedure summarized in Example 1 except that the molecular weights of the polyisoprene blocks by gel permeation chromatography were 41,600 and the polybutadiene blocks were 12,700. Nmr analysis indicated that 90.5 percent of the butadiene had been incorporated by 1,4-addition, and the butadiene represented 20.5 percent of the total polydiene content of the arms. After coupling with divinylbenzene, NMR analysis indicated that the 1,4-addition of butadiene was 90.5 percent, and that butadiene represented 20.4 percent of the diene content. The star polymer was next hydrogenated at 75° C. to saturate greater than 98% of the olefinic unsaturation originally contained in the isoprene and butadiene blocks. The solution was washed at 100° C. before polymer separation from solvent. The data and results are summarized in Table 1.

EXAMPLE 3

(Comparison)

In this example, a star polymer comprising hydrogenated poly(isoprene-butadiene) diblock copolymer arms was prepared using the procedure summarized in Example 1 except that the number average molecular weight of the polyisoprene blocks by gel permeation chromatography were 31,700 and the polybutadiene blocks were 15,500. Nmr analysis indicated that 90.8 percent of the butadiene had been incorporated by 1,4-addition, and the total butadiene represented 29.9 percent of the total polydiene content of the arms. After coupling with divinylbenzene, analysis of the coupled, unhydrogenated star polymer indicated that the 1,4-addition of butadiene was 90.9 percent, and that the butadiene contained therein was 29.9 percent. The star polymer was next hydrogenated to remove greater than 99% of the olefinic unsaturation originally contained in the isoprene and butadiene blocks. The polymer solution became extremely viscous upon hydrogenation; it was diluted further with cyclohexane before acid-wash and polymer separation. The melting point of the PE-like blocks was determined to be 98.5° C. by differential scanning calorimetry. The data and results are summarized in Table 1.

EXAMPLE 4

(Comparison)

In this example, a star polymer comprising hydrogenated poly(isoprene-butadiene) diblock copolymer arms was prepared using the procedure summarized in Example 1 except that the molecular weight of the polyisoprene blocks by gel permeation chromatography were 58,000 and the polybutadiene blocks were 11,200. Nmr analysis indicated that 90.6 percent of the butadiene had been incorporated by 1,4-addition, and the butadiene represented 14.7 percent of the total polydiene content of the arms. After coupling with divinylbenzene, analysis of the coupled, unhydrogenated star polymer indicated that the 1,4-addition of butadiene was 90.2 percent, and that butadiene represented 14.5 percent of the polydiene content. The star polymer was next hydrogenated so as to saturate greater than 98% of the olefinic unsaturation originally contained in the isoprene and butadiene blocks. The melting point of the PE-like blocks was determined to be 95.0° C. by differential scanning calorimetry. The data and results are summarized in Table 1.

EXAMPLE 5

(Comparison)

In this example, a star polymer comprising hydrogenated poly(isoprene-butadiene) diblock copolymer arms was prepared using the procedure summarized in Example 1 except that a ratio of 4 moles of divinylbenzene per mole of living polymer was used for coupling purposes and the molecular weight of the polyisoprene blocks by gel permeation chromatography were 30,100 and the polybutadiene blocks were 5,250. The polybutadiene content is estimated to be 14.8 percent. The star polymer was next hydrogenated to saturate greater than 98% of the olefinic unsaturation originally contained in the isoprene and butadiene blocks, and the resultant solution was acid washed and the polymer separated. Finished product NMR analysis indicated that 99.1 percent of the olefinic unsaturation had been removed. The results are summarized in Table 1.

EXAMPLE 6

(Comparison)

In this example, a star polymer comprising hydrogenated poly(isoprene-butadiene) diblock copolymer arms was prepared using the procedure summarized in Example 1 except that a ratio of 4 moles of divinylbenzene per mole of living polymer was used for coupling purposes and the molecular weight of the polyisoprene blocks by gel permeation chromatography were 38,800 and the polybutadiene blocks were 10,400. It was estimated that the butadiene represented 21.2 percent of the total polydiene content of the arms. The star polymer was hydrogenated and the resultant solution was aqueous acid and water washed at 90° C. Nmr analysis of the final product showed that it was 99.2 percent of the olefinic unsaturation had been removed by hydrogenation. The melting point of the PE-like blocks was determined to be 94.9° C. by differential scanning calorimetry. The data and results are summarized in Table 1.

EXAMPLE 7

(Comparison)

In this example, a star polymer comprising hydrogenated poly(isoprene-butadiene) diblock copolymer arms was prepared using the procedure summarized in Example 1 except that a ratio of 4 moles of divinylbenzene per mole of living polymer was used for coupling purposes. The molecular weight of the polyisoprene blocks (I) by gel permeation chromatography were 56,250, and polybutadiene blocks (B) were 12,000. The butadiene content was estimated to be 17.6 percent. Analysis of the diblock polymer indicated that 10.5 percent of butadiene was incorporated into the block copolymer. After coupling with divinylbenzene, the star polymer was hydrogenated and the resultant reaction mixture was aqueous acid and water washed at 100° C. It was subsequently determine that 99.3 percent of the olefinic unsaturation originally contained in the isoprene and butadiene blocks had been removed by hydrogenation. The melting point of the polyethylene-like blocks was determined to be 92.0° C. by differential scanning calorimetry. The data and results are summarized in Table 1.

EXAMPLE 8

In this example, a star polymer comprising hydrogenated poly(isoprene-butadiene-isoprene) triblock copolymer arms was prepared using the procedure summarized in Example 1 except that after the poly(isoprene-butadiene) blocks were incorporated, isoprene monomer was again added to the living polymer. The molecular weight of the outer polyisoprene blocks by gel permeation chromatography were 34,200, the polybutadiene blocks were 5,300, and the inner polyisoprene blocks were 11,100. NMR analysis of the triblock polymer arms indicated that 10.5 percent of butadiene was incorporated into the block copolymer and that 90.0 percent of the butadiene polymerized by 1,4-addition. After coupling with divinylbenzene, the star polymer cement was reduce from 20 percent to 10 percent solids content, hydrogenated at 65° C. and the resultant reaction mixture aqueous acid and water washed at 50° C. It was subsequently determine that 99.3 percent of the olefinic unsaturation originally contained in the isoprene and butadiene blocks had been removed by hydrogenation. The melting point of the PE-like blocks was determined to be 84.8° C. by differential scanning calorimetry. The data and results are summarized in Table 1.

EXAMPLE 9

In this example, a star polymer comprising hydrogenated poly(isoprene-butadiene-isoprene) triblock copolymer arms was prepared using the procedure summarized in Examples 1 and 8. The molecular weight of the outer polyisoprene blocks by GPC were 26,000, the polybutadiene blocks were 5,200, and the inner polyisoprene blocks were 22,300. NMR analysis of the triblock polymer indicated that 10.5 percent of butadiene was incorporated and that 90.0 percent of the butadiene had been added by 1,4-addition. After coupling with divinylbenzene, the star polymer cement was hydrogenated and the resultant reaction mixture was aqueous acid and water washed. It was subsequently determined that 99.3 percent of the olefinic unsaturation originally contained in the isoprene and butadiene blocks had been removed by hydrogenation. The data and results are summarized in Table 1.

EXAMPLE 10

(Comparison)

In this example, a selectively hydrogenated star polymer comprising arms of a single block of polystyrene and a single block of hydrogenated polyisoprene was prepared. In the first step of the preparation, living molecules of polystyrene were prepared by anionically polymerizing styrene in cyclohexene. The polymerization of the styrene was initiated by adding sec-butyllithium. The polymerization of the styrene was completed to produce living polystyrene molecules having a number average molecular weight of 3,200. Polyisoprene blocks were then formed by adding isoprene to the solution of living polystyrene molecules. The polymerization of isoprene was then completed to produce polyisoprene blocks having a number average molecular weight of 51,000.

The living polymer molecules were then coupled with divinylbenzene using 3 moles of divinylbenzene per mole of the polymer molecules. The coupling reaction was allowed to proceed to completion after which the lithium sites remaining in the star polymer were deactivated by adding methanol.

The star polymer was next hydrogenated so as to saturate greater than 98% of the olefinic unsaturation originally contained in the polyisoprene and less than 15% of the aromatic unsaturation using the catalyst of Example 1 (2.3:1 Al/Ni).

EXAMPLE 11

(Comparison)

In this example, a star polymer comprising homopolymer arms of hydrogenated polyisoprene was prepared using the procedure summarized in Example 1 except that butadiene was omitted and the molecular weight of the polyisoprene blocks was 35,000. The data and results are summarized in Table 1.

EXAMPLE 12

(Comparison)

In this example, a star polymer comprising homopolymer arms of hydrogenated polyisoprene was prepared using the procedure summarized in Example 1 except that butadiene was omitted and the molecular weight of the polyisoprene was 46,000. The data and results are summarized in Table 1.

EXAMPLE 13

(Comparison)

In this example, a linear hydrogenated poly(isoprene-butadiene-isoprene) block copolymer was prepared. In the first step of the preparation, living molecules of polyisoprene were prepared by anionically polymerizing isoprene in cyclohexane. The polymerization of the isoprene was initiated by adding sec-butyllithium. The polymerization of the isoprene was completed to produce living polyisoprene molecules having a number average molecular weight of 91,400. Polybutadiene blocks were formed by adding butadiene to the solution of living polyisoprene anion. The polybutadiene blocks had a number average molecular weight of 16,5000. The living polymer anion was then reacted with additional isoprene. The second block of polyisoprene had a number average molecular weight of 116,000. Proton NMR indicated that 89.5 percent of butadiene polymerized by 1,4-addition. From proton NMR it was also determined that 7.9% of the polymer was comprised of polybutadiene. The polymer was then hydrogenated using a catalyst prepared by combining nickel ethylhexanoate and triethylaluminum (2.3 moles of aluminum per mole of nickel). Proton NMR indicated that the polymer was 98.81 hydrogenated. The results are summarized in Table 1.

EXAMPLES 14–25

In these examples, 5% oil concentrates were prepared from the polymer examples in Table 1. The polymers were dissolved with stirring and at 240° F. in HVI 100 neutral (Exxon low pour basestock). The concentrates were allowed to cool to room temperature overnight. Table 2 identifies the polymer concentrates that were fluid or gelled at room temperature.

EXAMPLES 25–37

An SAE 10W-30 multigrade was made using polymer example 1c and SAE 10W-40 mutigrade engine oils were prepared using polymer examples 2c–13. For the SAE 10W-40 oils the amount of each VI improver used was controlled so as to provide lubricating oil compositions having kinematic viscosities in the range of 13.5–15.0 centistokes (cst) at 100° C. Lubricant compositions for both the SAE 10W-30 and the SAE 10W-40's contained, in addition to the polymer, 11.60 percent weight of "DI" package ECA 12850 (available from Exxon Chemical), 0.1 wt % Acryloid 155 polymethacrylate pour point depressant (available from Rohm and Haas), 8.5 percent weight HVI 250 neutral (Shell Deer Park), and HVI 100N (Shell Deer Park).

TABLE 1

| Example | Isoprene, I (MW$_1$) | Butadiene, B (MW$_2$) | Isoprene, I' (MW$_3$) | I/I' | Melting Point, °C. | % B |
|---|---|---|---|---|---|---|
| 1 c | 45,000 | 4,800 | na* | — | 89 | 10.5 |
| 2 c | 41,600 | 12,700 | na* | — | — | 20.5 |
| 3 c | 31,700 | 15,500 | na* | — | 98.5 | 29.9 |
| 4 c | 58,000 | 11,200 | na* | — | 95.0 | 14.5 |
| 5 c | 30,100 | 5,250 | na* | — | 89.9 | 14.8 |
| 6 c | 38,800 | 10,400 | na* | — | 94.9 | 21.2 |
| 7 c | 56,250 | 12,000 | na* | — | 92.0 | 17.6 |
| 8 | 34,200 | 5,300 | 11,100 | 3.1 | 84.8 | 10.5 |
| 9 | 26,000 | 5,200 | 22,300 | 1.2 | — | 10.5 |
| 11 c | 35,000 | na* | na* | — | — | na* |
| 12 c | 46,000 | na* | na* | — | — | na* |
| 13 c | 91,400 | 16,500 | 116,000 | — | — | 7.9 |

*na = not applicable

TABLE 2

| Example | Polymer Example | Concentrate Fluidity |
|---|---|---|
| 13 c | 1 c | flows readily-no gel |
| 14 c | 2 c | flows very slowly-gel |
| 15 c | 3 c | would not flow-gel |
| 16 c | 4 c | would not flow-gel |
| 17 c | 5 c | flows readily-no gel |
| 18 c | 6 c | would not flow-gel |
| 19 c | 7 c | would not flow-gel |
| 20 | 8 | flows readily-no gel |
| 21 | 9 | flows readily-no gel |
| 22 c | 10 c | flows readily-no gel |
| 23 c | 11 c | flows readily-no gel |
| 24 c | 12 c | flows readily-no gel |
| 25 c | 13 c | would not flow-gel |

The viscosity index (VI), the cold cranking simulator (CCS) viscosity at −20° C. (in centipoise), the engine oil pumping viscosity (in poise) at −25° C. using the mini-rotary viscometer TP1-MRV method (ASTM D4684), were determined for each lubricating oil composition. TP1-MRV results are failing if viscosity is above 300 poise or if there is a yield stress exhibited in the test. The data and results are summarized in Table 3.

EXAMPLES 39–52

A series of SAE 10W-40 multigrades were prepared using the same materials as in Examples 25–38, except that the pour point depressant was changed to 0.5 percent weight Acryloid 160, a polymethacrylate available from Rohm and Haas Company. The properties of the multigrades are given in Table 4.

While the present invention has been described and illustrated by reference to particular embodiments thereof, it will be appreciated by those of ordinary skill in the art that the same lends itself to experimental determination of the limits of the invention which are established solely by the appended claims.

TABLE 3

| Ex. | Polymer Ex. | Polymer Wt % | KV 100° C. cSt | VI | CCS cP | TP1 MRV[a] −25° C., Vis in Poise (P) |
|---|---|---|---|---|---|---|
| 25 c | 1 c | 1.04 | 11.20 | 176** | 2,710 | fail-y.s. |
| 26 c | 2 c | 1.10 | 15.03 | 185** | 3,180 | fail-y.s. |
| 27 c | 3 c | 1.07 | 13.65 | 33*** | 2,860 | fail-y.s.; pass, 205 P; Pass-224 P[b] |
| 28 c | 4 c | 0.84 | 13.54 | 217** | 2,760 | fail-y.s. |
| 29 c | 5 c | 1.18 | 13.61 | 205** | 2,850 | fail-y.s. |
| 30 c | 6 c | 0.98 | 13.82 | 193** | 3,090 | fail-y.s. |
| 31 c | 7 c | 0.75 | 13.65 | 214** | 2,780 | fail-y.s |
| 32 | 8 | 0.98 | 13.77 | 157 | 2,820 | pass-160 P |
| 33 | 9 | 1.01 | 13.64 | 159 | 2,860 | pass-111 P |
| 34 c | 10 c | .97 | 13.75 | 158 | 3,040 | pass-150 P |
| 35 c | 11 c | 1.27 | 14.17 | 160 | 3,190 | pass-172 P |
| 36 c | 12 c | 1.02 | 13.5 | 158 | 3,010 | pass-147 P |
| 37 c | 13 c | 0.74 | 13.90 | 159 | 3,140 | fail-y.s. |
| 38 c | none | 0.0 | 6.36 | 119 | 2,510 | pass-66 P |

[a] y.s. = yield stress
[b] in three tests: two passes, one fail
**time dependent increase
***time dependent decrease

TABLE 4

| Example | Polymer Example | Polymer % wt. | Kin Vis 100° C. | CCS | TP1-MRV | VI |
|---|---|---|---|---|---|---|
| 39 c | 1 c | 1.04 | 13.82 | 2,970 | 143 | 186** |
| 40 c | 2 c | 1.10 | 13.88 | 2,880 | 113 | 176** |
| 41 c | 3 c | 1.07 | 13.96 | 3,000 | fail* | — |
| 42 c | 4 c | 0.84 | 14.09 | 2,800 | 128 | 211** |
| 43 c | 5 c | 1.18 | 13.81 | 2,980 | 128 | 211** |
| 44 c | 6 c | 0.98 | 14.1 | 2,990 | 112 | 134*** |
| 45 c | 7 c | 0.75 | 13.91 | 2,890 | 133 | 211* |
| 46 | 8 | 0.98 | 14.06 | 2,910 | 120 | 158 |
| 47 | 9 | 1.01 | 13.94 | 2,980 | 129 | 158 |
| 48 c | 10 c | 0.97 | 14.13 | 3,200 | 173 | 159 |
| 49 c | 11 c | 1.27 | 14.41 | 3,430 | 176 | 161 |
| 50 c | 12 c | 1.02 | 13.83 | 3,250 | 174 | 159 |
| 51 c | 13 c | 0.74 | 14.12 | 3,330 | 177 | 159 |
| 52 c | NONE | 0.0 | 6.47 | 2,360 | 72 | 124 |

*fail by yield stress
**VI increases
***VI decreases

What is claimed is:

1. A solid polymeric viscosity index (VI) improver, comprising a star polymer structure (EP-EB-EP')$_n$-X; wherein
EP is an outer hydrogenated block of polyisoprene having a number average molecular weight (MW$_1$) between 6,500 and 85,000 before hydrogenation;
EB is a hydrogenated block of polybutadiene having a number average molecular weight (MW$_2$) between 1,500 and 15,000 before hydrogenation and having at least 85% 1,4-polymerization; and
EP' is an inner hydrogenated block of polyisoprene having a number average molecular weight (MW$_3$) between 1,500 and 55,000 before hydrogenation;
wherein the star polymer structure comprises from 3% to 15% by weight of the butadiene, the ratio of MW$_1$/MW$_3$ is from 0.75:1 to 7.5:1, X is a nucleus of a polyalkenyl coupling agent, and n is the number of block copolymer arms in the star polymer when coupled with 2 or more moles of the polyalkenyl coupling agent per mole of living block copolymer molecules.

2. The VI improver of claim 1, wherein the polyalkenyl coupling agent is divinylbenzene.

3. The VI improver of claim 2, wherein the molecular weight of the outer polyisoprene blocks is between 15,000 and 65,000 before hydrogenation, the molecular weight of the polybutadiene block is between 2,000 and 6,000 before hydrogenation, the molecular weight of the inner polyisoprene blocks is between 5,000 and 40,000 before hydrogenation, the star polymer comprises less than 10% by weight of the butadiene, and the ratio of MW$_1$/MW$_3$ is from 0.9:1 to 5:1.

4. The VI improver of claim 3, wherein the 1,4-polymerization of the polybutadiene block is at least 89%.

5. The VI improver of claim 4, wherein n is the number of arms when coupled with at least 3 moles of divinylbenzene per mole of living block copolymer molecules.

6. The VI improver of claim 1, wherein the polyisoprene blocks and the polybutadiene blocks are at least 98% hydrogenated.

7. An oil composition comprising:
a base oil; and
a viscosity improving amount of a star polymer having the structure (EP-EB-EP')$_n$-X wherein:
EP is an outer hydrogenated block of polyisoprene having a number average molecular weight (MW$_1$) between 6,500 and 85,000 before hydrogenation;
EB is a hydrogenated block of polybutadiene having a number average molecular weight (MW$_2$) between 1,500 and 15,000 before hydrogenation and having at least 85% 1,4-polymerization; and EP' is an inner hydrogenated block of polyisoprene having a number average molecular weight (MW$_3$) of between 1,500 and 55,000 before hydrogenation;
wherein the star polymer comprises from 3% to 15% by weight of the butadiene, the ratio of MW$_1$/MW$_3$ is from 0.75:1 to 7.5:1, X is a nucleus of a polyalkenyl coupling agent, and n is the number of block copolymer arms in the star polymer when coupled with 2 or more moles of the polyalkenyl coupling agent per mole of living block copolymer molecules.

8. The oil composition of claim 7, wherein the polyalkenyl coupling agent is divinylbenzene.

9. The oil composition of claim 8, wherein the molecular weight of the outer polyisoprene blocks is between 15,000 and 65,000 before hydrogenation, the molecular weight of the polybutadiene block is between 2,000 and 6,000 before hydrogenation, the molecular weight of the inner polyisoprene blocks is between 5,000 and 40,000 before hydrogenation, the star polymer comprises less than 10% by weight of the butadiene, and the ratio of MW$_o$/MW$_i$ is from 0.9:1 to 5:1.

10. The oil composition of claim 9, wherein the 1,4-polymerization of the polybutadiene blocks is at least 89%.

11. The oil composition of claim 10, wherein n is the number of arms when coupled with at least 3 moles of divinylbenzene per mole of living block copolymer molecules.

12. The oil composition of claim 7, wherein the polyisoprene blocks and the polybutadiene blocks are at least hydrogenated.

13. A polymeric concentrate for oil compositions comprising:
at least 85% by weight of a base oil; and
from 5% to 15% by weight of a star polymer having the structure $(EP-EB-EP')_n-X$ wherein:

EP is an outer hydrogenated block of polyisoprene having a number average molecular weight ($MW_1$) between 6,500 and 85,000 before hydrogenation;

EB is a hydrogenated block of polybutadiene having a number average molecular weight ($MW_2$) between 1,500 and 15,000 before hydrogenation and having at least 85% 1,4-polymerization; and EP' is an inner hydrogenated block of polyisoprene having a number average molecular weight ($MW_3$) of between 1,500 and 55,000 before hydrogenation;

wherein the star polymer comprises from 3% to 15% by weight of the butadiene, the ratio of $MW_1/MW_3$ is from 0.75:1 to 7.5:1, X is a nucleus of a polyalkenyl coupling agent, and n is the number of block copolymer arms in the star polymer when coupled with 2 or more moles of the polyalkenyl coupling agent per mole of living block copolymer molecules.

14. The polymeric concentrate of claim 13, wherein the polyalkenyl coupling agent is divinylbenzene.

15. The polymeric concentrate of claim 14, wherein the molecular weight of the outer polyisoprene blocks is between 15,000 and 65,000 before hydrogenation, the molecular weight of the polybutadiene block is between 2,000 and 6,000 before hydrogenation, the molecular weight of the inner polyisoprene blocks is between 5,000 and 40,000 before hydrogenation, the star polymer comprises less than 10% by weight of the butadiene, and the ratio of $MW_1/MW_3$ is from 0.9:1 to 5:1.

16. The polymeric concentrate of claim 15, wherein the 1,4-polymerization of the polybutadiene blocks is at least 89%.

17. The polymeric concentrate of claim 16, wherein n is the number of arms when coupled with at least 3 moles of divinylbenzene per mole of living block copolymer molecules.

18. The polymeric concentrate of claim 13, wherein the polyisoprene blocks and the polybutadiene blocks are at least 98% hydrogenated.

* * * * *